J. A. McCLELLAND.
Stamp-Canceller.

No. 222,067.   Patented Nov. 25, 1879.

Attest:
Benj. A. Smith
W. A. Hutchinson

Inventor
John A. McClelland
by Saml. A. Duncan, atty

UNITED STATES PATENT OFFICE.

JOHN A. McCLELLAND, OF LOUISVILLE, KENTUCKY.

IMPROVEMENT IN STAMP-CANCELERS.

Specification forming part of Letters Patent No. 222,067, dated November 25, 1879; application filed October 8, 1878.

*To all whom it may concern:*

Be it known that I, JOHN A. MCCLELLAND, of Louisville, Jefferson county, Kentucky, have invented a Stamp-Canceler, of which the following is a specification.

The object of my invention is to quickly mutilate postage-stamps by roughening the surface or cutting grooves through the stamps, for the purpose of canceling them so effectually that an attempt to repass them may be readily discovered; and it consists, first, in a sharp-toothed circular saw or saws arranged to revolve rapidly within a tubular case or handle; second, in a device for regulating the depth which the saws shall cut.

Figure 1:
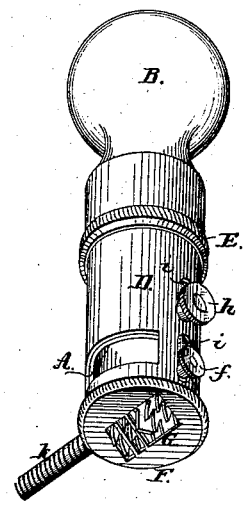
Figure 2:
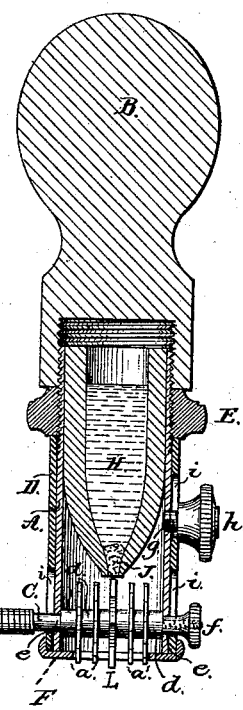
Figure 3:
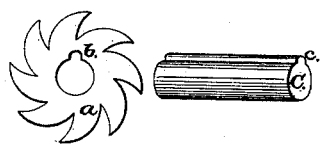
Figure 4:
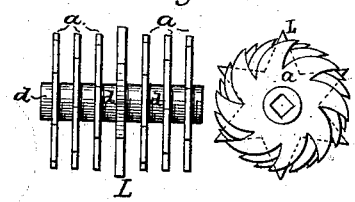
Figure 5:
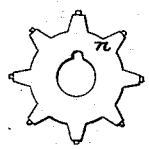

Figure 1 is a perspective view of my invention. Fig. 2 is a central vertical section, and Figs. 3 and 4 are detached views of the saws and saw-arbor. Fig. 5 shows a diamond-toothed saw that may be substituted for the usual steel teeth.

A is the tubular body of the canceler, having bearings near its lower end, in which the saw-arbor C revolves. This arbor C is connected by means of any styled flexible shaft, $k$, to any driving apparatus which shall give it a rapid revolving motion.

The saws $a$ are of the usual circular type, having long teeth, whose thin edges are so far apart as to be easily ground on an emery-wheel or stone, very sharp edges producing the best results.

The teeth are necessarily deep, that they may readily free themselves from their saw-dust of paper-lint.

The saw $a$ is caused to revolve with the arbor C by means of a spline, $c$, buried part in the arbor and projecting to enter the notch $b$, Fig. 3, in the saw; and when several saws are used they are kept at proper distance apart on the arbor by means of collars $d$ interposed.

The arbor C is kept in its proper bearings by means of a screw-nut, $f$, on its end. The body-tube A is screwed into a handle, B, at its upper end, the same screw-thread extending down the body to receive the screw-nut E, which serves as an abutment for the upper end of the outer tube, D. Said tube D has a telescopic movement upon the body A, and is bound to the body at any point of its course by means of the set-screw $h$.

On the outer tube, D, is placed a cap, F, covering the lower end of the tube, except where openings are made in said cap for the saw-edges $a$ to project. This cap F may be removed to clean the instrument or to arrange the saws. The purpose of this cap is to regulate the distance which the saws shall enter the stamp, (the cap being pressed down upon the stamp in use,) this being accomplished with the greatest nicety by means of the adjusting-nut E acting against the tube D, to which the cap F is fixed, and all so secured by the binding-screw $h$.

In Fig. 4 the saws $a$ are shown placed spirally upon the arbor.

It is sometimes desirable to use an inking attachment to a canceling-stamp. Such a device is shown in Fig. 2, in which H is a fountain of ink, J is a wick or sponge, and L the printing-disk.

To use my canceling-stamp, cause the flexible shaft $k$, and with it the arbor and saws, to revolve rapidly by any convenient power, press the cap F upon the stamp, having a cushion of slightly-yielding material under the letter, and the saws will cut grooves in the stamp.

I am aware that stamp-cancelers having inking devices similar to this are old; that the flexible driving-shaft is common; that revolving disks having serrated or rasp-like edges and barrel-saws having hooked teeth have both been used in stamp-cancelers. I therefore do not claim these devices; but

I claim as my invention and wish to secure by Letters Patent—

The combination of the circular saws $a$, arbor C, telescopic case D, cap F, adjusting screw-nut E, and binding-screw $h$, substantially as and for the purpose specified.

JOHN A. McCLELLAND.

Witnesses:
J. SPEED PEAY,
JOHN DE HART.